(12) United States Patent
Tam et al.

(10) Patent No.: US 7,640,211 B2
(45) Date of Patent: Dec. 29, 2009

(54) SYSTEM AND METHOD FOR BILLING AUGMENTATION

(75) Inventors: Derek Hung Kit Tam, Reston, VA (US); Robert C. Lovell, Jr., Leesburg, VA (US)

(73) Assignee: Sybase 365, Inc., Reston, VA (US)

(*) Notice: Subject to any disclaimer, the term of this patent is extended or adjusted under 35 U.S.C. 154(b) by 1008 days.

(21) Appl. No.: 10/837,695

(22) Filed: May 4, 2004

(65) Prior Publication Data

US 2005/0216403 A1    Sep. 29, 2005

Related U.S. Application Data

(60) Provisional application No. 60/552,449, filed on Mar. 12, 2004.

(51) Int. Cl.
G06Q 40/00 (2006.01)
H04M 15/00 (2006.01)

(52) U.S. Cl. .......................... 705/40; 379/114

(58) Field of Classification Search ............... 705/36 R, 705/1–45; 709/224; 379/112–115
See application file for complete search history.

(56) References Cited

U.S. PATENT DOCUMENTS

| | | | |
|---|---|---|---|
| 5,351,235 | A | 9/1994 | Lahtinen |
| 5,621,727 | A | 4/1997 | Vaudreuil |
| 5,768,509 | A | 6/1998 | Gunluk |
| 5,887,249 | A | 3/1999 | Schmid |
| 5,894,478 | A | 4/1999 | Barzegar et al. |
| 6,182,054 | B1* | 1/2001 | Dickinson et al. ............. 705/34 |
| 6,208,870 | B1 | 3/2001 | Lorello et al. |
| 6,230,009 | B1 | 5/2001 | Holmes et al. |
| 6,240,293 | B1 | 5/2001 | Koster |
| 6,266,401 | B1* | 7/2001 | Marchbanks et al. ........ 379/116 |
| 6,327,267 | B1 | 12/2001 | Valentine et al. |
| 6,366,663 | B1 | 4/2002 | Bauer et al. |

(Continued)

FOREIGN PATENT DOCUMENTS

EP    0 777 394 A1    12/1995

(Continued)

OTHER PUBLICATIONS

A fair share Jef Morrow. Telephony. Chicago: Sep 8, 1997. vol. 233, Iss. 10; pg. 100.*

(Continued)

Primary Examiner—Thomas A Dixon
Assistant Examiner—William E Rankins
(74) Attorney, Agent, or Firm—Edell, Shapiro & Finnan, LLC

(57) ABSTRACT

System and method for providing augmented billing services. Where a billing system cannot keep pace with new services being marketed and the specialized pricing associated with such new services, a system and method are provided that generate a billing augmentation messages that are sent to the billing entity and that cause an incremental increase of a bill for the handling of a particular message type. The incremental increase is equivalent to a charge that the billing system is already configured to bill. In a preferred embodiment of the invention, the message is an electronic message such as an SMS message and the billing augmentation messages are generated by and sent from an intercarrier vendor.

9 Claims, 1 Drawing Sheet

U.S. PATENT DOCUMENTS

| | | |
|---|---|---|
| 6,421,437 B1 | 7/2002 | Slutsman |
| 6,505,051 B1 * | 1/2003 | Alperovich et al. ......... 455/466 |
| 6,535,746 B1 | 3/2003 | Yu et al. |
| 6,560,226 B1 | 5/2003 | Torrey et al. |
| 6,594,254 B1 | 7/2003 | Kelly |
| 6,658,260 B2 | 12/2003 | Knotts |
| 6,714,978 B1 * | 3/2004 | Porter ....................... 709/224 |
| 6,738,630 B2 | 5/2004 | Ashmore |
| 6,772,267 B2 | 8/2004 | Thaler et al. |
| 2002/0015403 A1 | 2/2002 | McConnell et al. |
| 2002/0029189 A1 | 3/2002 | Titus et al. |
| 2002/0072333 A1 | 6/2002 | Gnesda et al. |
| 2002/0112014 A1 | 8/2002 | Bennett et al. |
| 2002/0167909 A1 | 11/2002 | Balazinski et al. |
| 2003/0083078 A1 | 5/2003 | Allison et al. |
| 2003/0118027 A1 | 6/2003 | Lee et al. |
| 2003/0202521 A1 | 10/2003 | Havinis et al. |
| 2004/0032856 A1 | 2/2004 | Sandstrom |
| 2006/0276171 A1 * | 12/2006 | Pousti ....................... 455/405 |

FOREIGN PATENT DOCUMENTS

| | | |
|---|---|---|
| EP | 0 959 600 A1 | 4/1999 |
| WO | WO 97/36434 | 3/1996 |
| WO | WO 97/20442 | 11/1996 |
| WO | WO 99/11078 | 8/1998 |
| WO | WO 99/33226 | 12/1998 |
| WO | WO 00/41533 | 1/2000 |
| WO | WO 02/25875 | 9/2001 |

OTHER PUBLICATIONS

A fair share Jef Morrow. Telephony. Chicago: Sep 8, 1997. vol. 233, Iss. 10.*

A fair share Jef Morrow. Telephony. Chicago: Sep 8, 1997. vol. 233, Iss. 10.*

International Search Report & Written Opinion, Jul. 28, 2006.

* cited by examiner

SYSTEM AND METHOD FOR BILLING AUGMENTATION

This application claims the benefit of U.S. Provisional Application No. 60/552,449, filed Mar. 12, 2004, which is herein incorporated by reference in its entirety.

BACKGROUND

1. Field of the Invention

The present invention relates generally to a system and method for augmenting a billing service. More specifically, the present invention relates to providing billing services to account for deficiencies in an existing billing system so that new services may be introduced and properly accounted for without the need for modification/overhaul of the existing system.

2. Background of the Invention

Large billing systems, such as those operated or managed by a telecommunications service provider, are traditionally known for being difficult to change or enhance. This difficulty can be compounded by, for example, an acquisition of one service provider along with its outdated billing system, by another service provider. Until the acquired entity can be integrated into the parent entity's system, the old billing system must be used and maintained. In addition, some service providers may switch to new software and, as a result, be unwilling to modify older software that is slated to be phased out. During the phase out period, the old software may be inadequate for handling new service offerings. In some circumstances, it simply is often the case that a complex billing system requires long lead times for implementation of new billing modules.

In any of these situations, as well as many others that may be encountered, it would not be uncommon for an upgrade in a telecommunications billing system to take ten to twelve months, or more. As a result, service offerings may often be gated or constrained only to that which a service provider's billing system can support. The rationale behind this is that until the billing system is capable of properly accounting for usage of a new offering, the service provider simply will decline to offer that service. This creates an unfortunate situation whereby a new and/or desirous service is ready for introduction, but has to be withheld until the billing department can provide proper billing support.

Such a delay in roll out of new services can severely hamper a service provider from being able to respond quickly to market conditions. Other areas that may be similarly impacted are the ability to implement new customer acquisition and retention programs, deployment of products and services with higher revenue potential, and the ability to offer more flexible pricing models, just to name a few examples.

It would be desirable to provide a billing augmentation service that could alleviate one or more problems associated with the above-described and other similar billing system deficiencies.

BRIEF SUMMARY OF THE INVENTION

The present invention provides a billing augmentation method wherein a message sent by a customer is received over an electronic network. This message is analyzed to determine if the message falls into a first service charge category or a second service charge category, the second service charge category having a billing charge greater than that of the first service charge category. The message is then processed and an initial billing event is generated to bill the customer an amount in accordance with the first service charge category. When the message falls into the second service charge category, there is generated a subsequent billing event to bill the customer an amount in accordance with the first service charge category to cause a charge to the customer to be augmented such that an overall charge to the customer is substantially the same as the billing charge of the second service charge category.

In one aspect of the invention, the first service charge category is applied to basic messages for which a service provider has an existing associated billing event and the second service charge category is applied to premium messages for which the service provider does not have an existing associated billing event.

In another aspect of the invention the analysis of the message is performed by an outside vendor to determine whether the subsequent billing event needs to be generated. Such a vendor is preferably an intercarrier vendor (ICV) via which the message is likely touted.

In still another aspect of the invention, the initial billing event is generated by the service provider and the outside vendor (e.g., the ICV), generates the subsequent billing event.

In one possible embodiment, the initial billing event and the subsequent billing event cause the overall charge to be incrementally increased by a same amount. In another possible embodiment, the initial billing event and the subsequent billing event cause the overall charge to be increased by different amounts.

In a preferred embodiment of the invention the subsequent billing event is triggered by a billing augmentation message (BAM) that is generated by the ICV and sent to a wireless carrier that serves a customer from whom the message is received.

These and other features of the present invention and their attendant advantages will be more fully understood upon reading the following detailed description in conjunction with associated drawings.

DETAILED DESCRIPTION OF THE INVENTION

The present invention is described herein in the context of augmenting and improving a wireless telecommunications service provider's billing system. However, it will be apparent to those of skill in the art that the present invention may apply to any billing system and is not intended to be limited only to those used for telecommunications services. Further, as used herein, the term "message" is intended to apply to any communication or event within a service provider's system that triggers a need for billing a customer for the event and is not intended to be limited solely to messages in the literal sense.

Figure 1:
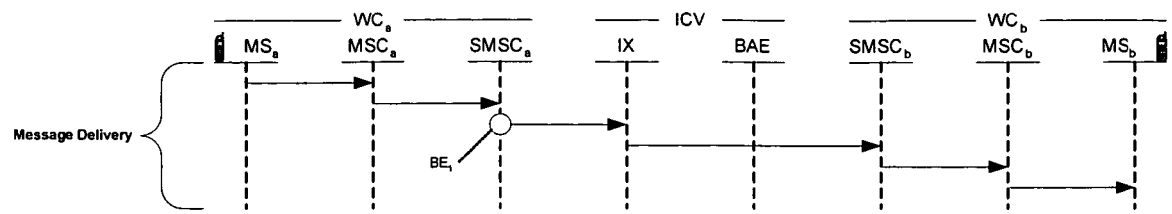
FIG. 1 is a diagram showing an exemplary prior art billing system.

FIG. 1 depicts a typical delivery path of a short message service (SMS) message from one mobile subscriber (MS) to another. To begin with, $MS_a$, who is a customer of wireless carrier $WC_a$, initiates an SMS message to $MS_b$, who is a customer of wireless carrier $WC_b$. Because $MS_a$ and $MS_b$ are customers of different wireless carriers, it may be necessary for an intermediary, such as an inter-carrier vendor (ICV) to become involved to ensure proper routing of the message.

Such inter-carrier facilitation is described in co-pending U.S. application Ser. No. 10/426,662, entitled "An Intermediary Network System and Method for Facilitating Message Exchange Between Wireless Networks," which is incorporated herein by reference in its entirety. The functionality is preferably embodied in the ICV as an information exchange module (IX) that is capable of analyzing an incoming SMS message and that is further capable of applying an appropriate billing command or instruction in accordance with a billing augmentation engine (BAE), which has heretofore been unknown in the prior art. The IX preferably analyzes the SMS message and performs any necessary steps, such as, for example, translation, in order to allow the SMS message to be sent to $MS_b$. In the example of FIG. 1, the BAE is bypassed and the message is sent to short message service center $SMSC_a$ within $WC_a$, which passes the message, via the ICV (and IX), to $SMSC_b$ and mobile switching center $MSC_b$ servicing $MS_b$ at the time.

As long as the billing system Of $WC_a$ is equipped to handle the SMS message, the system will properly initiate a billing event, such as $BE_1$, in order to account for the charge to be assessed to $MS_a$, when the message passes through $WC_a$'S mobile switching center $MSC_a$ and $SMSC_a$ and on to the ICV. In the system of FIG. 1, $WC_a$ is only equipped to bill for basic SMS messages. If we imagine that typical basic messages are billed at $0.10, for example, then every time a basic SMS message is sent, billing event $BE_1$ is triggered so that the customer may be charged accordingly.

Now, if we imagine that $WC_a$ subsequently desires to introduce more complicated messages or any other new service or product that has a cost structure different from the basic $0.10 charge, then the billing system may not be equipped to handle the new product or service. Until the billing system is appropriately modified, $WC_a$ may be left with the decision to use its existing system, thus charging only $0.10 for a service that could easily garner a much higher charge, or it may decide to withhold the new offering entirely until its billing system can account for and charge the higher price. The billing augmentation engine (BAE) of the ICV is intended to allow $WC_a$ to market the more complicated messages or other new service without adjusting its billing system at all or to provide a "billing bridge" while the appropriate billing capability is incorporated into the existing billing system.

Figure 2:
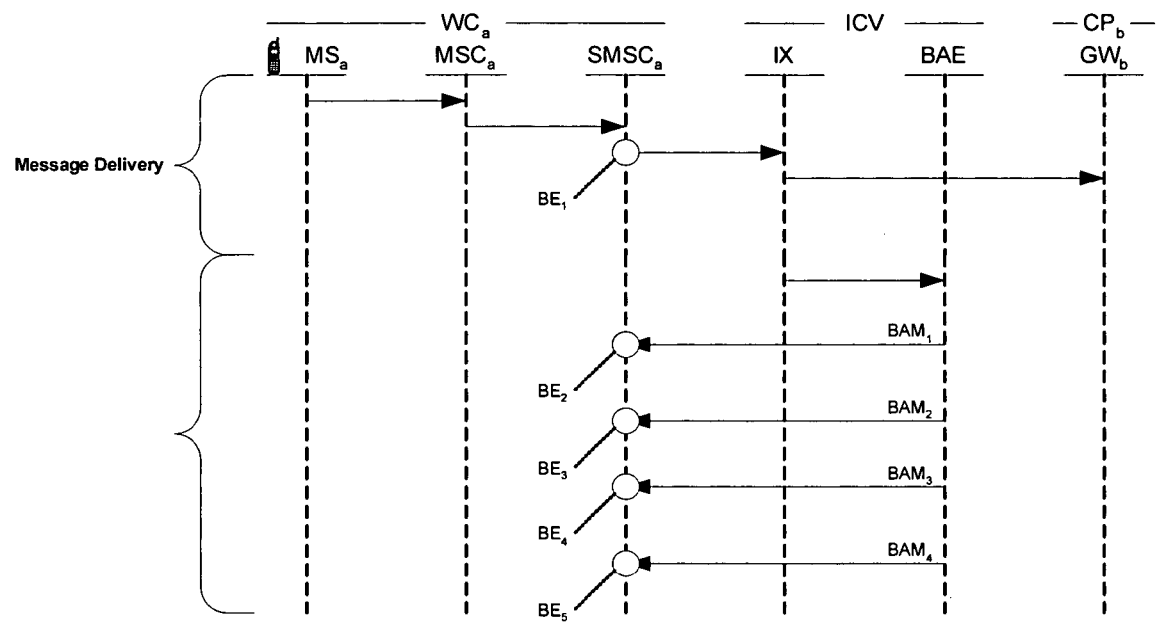
FIG. 2 is a diagram showing a billing system with augmentation according to an exemplary embodiment of the present invention.

As seen in FIG. 2, the use of the ICV's BAE is explained. As before, $MS_a$ sends an SMS message that is processed by Mobile switching center $MSC_a$ and $SMSC_a$ Of $WC_a$. The SMS message is then sent on to the ICV's IX for further processing so that the SMS message may be directed accordingly. If the SMS message is determined by the ICV to be a basic $0.10 message, then the message is sent on for delivery as is shown in FIG. 1.

If, however, the ICV determines that the SMS message is a premium, or more complicated, message (e.g., subscription services, alert or notification offering, etc.), costing more than the basic $0.10 fee, then the premium SMS message is sent to, for example, a message gateway $GW_b$ within a content provider, such as $CP_b$ for appropriate processing. Because the ICV has detected that the SMS message is a premium message and it knows that $WC_a$ is not equipped to handle billing for such a message, the BAE sends a series of billing augmentation messages (BAMs) $BAM_1$, $BAM_2$, $BAM_3$, and $BAM_4$. Each of the BAMs triggers an additional augmented billing event equal to $BE_1$ within $WC_a$'s billing system.

In the example depicted in FIG. 2, the premium SMS message has been determined by the ICV to be worthy of a $0.50 charge, so four additional $BE_1$'s, each representing the $0.10 fee for a basic SMS message, are needed so that $WC_a$'S outdated billing system can charge $MS_a$ the correct fee. The ICV's BEA is preferably configured to trigger any number of $BE_1$'s within $WC_a$'s billing system to account for a fee in some multiple of $BE_1$.

In the situation described in FIG. 2, $WC_a$ has a single standard billing event and the augmented events are simply tallied until the proper fee is charged. It may also be possible that $WC_a$'s billing system is actually set up with a plurality of billing events, but that none of its standard billing events properly account for a new service. In such a situation, $WC_a$ will generate whatever standard billing event it chooses and the ICV, knowing what standard event is charged by $WC_a$, will trigger a plurality of augmented billing events to make up for the difference in fees. For example $WC_a$ may also have a $BE_2$ that bills the customer $0.20 for a particular message. In such a situation, $WC_a$ still would be incapable of generating a $0.50 fee, but ICV can either trigger three $BE_1$'s to $WC_a$ to augment the billing or it could also trigger a single $BE_1$ along with an additional $BE_2$ to account for the proper generation of fees to $MS_a$.

It may also be appreciated that $WC_a$ may not have the technology in place to analyze the message and determine if a billing event needs to be created at all. In this situation, the message would be passed from $WC_a$ to the ICV for complete processing without any billing event being generated by $WC_a$. The ICV would then analyze the message to determine the proper billing augmentation and then trigger one or more augmented billing events to $WC_a$ to account for the fee in its entirety.

Because of the rigid nature typical billing systems, the BEA can only work within the framework of $WC_a$'s billing event structure. This creates a drawback in that a message may be deemed to have a proper charge that is not an exact multiple of one Of $WC_a$'s billing events. In such a case, the WC and the ICV would have to decide whether to round up or down to the nearest billing event fee. This may be advantageous, however, because a wireless carrier may decide to introduce a new service at a reduced rate, which could be set at a multiple of one of its existing billing events, and by the time their billing system catches up, they may end the promotional period.

Regardless of how such a billing decision is reached, one of skill in the art can see how much more quickly a service provider can introduce new products and services without being constrained by a lagging billing system modification. In addition, although the present invention has been described in relation to instances where a premium service garners a higher fee than a basic service, the billing augmentation is not limited to such a situation.

The present invention could be applied to any situation whereby a new service would result in a multiple of an existing billing event or events such that the ICV could relay BAMs to properly bill for the new service. The present invention may also be implemented within the wireless carrier itself thus eliminating the need to include an outside vendor as long as the evaluation and billing augmentation capabilities are present within the service provider's existing system to allow for such implementation.

Returning to FIG. 2, the billing event augmentation described may represent a "bucket" pricing plan whereby all messages are billed to the customer at $0.10. Because a premium message should be charged as $0.50, for example, the wireless carrier may desire that the customer's bill reflect a single $0.50 charge as opposed to a series of five $0.10 charges. In order to accomplish this, the wireless carrier may collapse the multiple billing events into a single charge that is reflected on the customer's bill, thus potentially reducing confusion. Collapsing may be accomplished by, for example, configuring the billing system to consider multiple triggered charges received within an extremely short time period (e.g., seconds) to be a single charge event.

The dynamically configurable billing augmentation rules employed by the ICV's BEA described above may include a range of parameters that determine when and how many BAMs should be generated. These may include one or more of the following, for example:

Message Source Address—The source address (e.g., a mobile subscriber's telephone number) of a message and may be specified individually or by range.

Source Network Element—The network element (e.g., SMSC, etc.) from which a message is received. This may be specified individually or by range.

Source—The identified source (e.g., wireless carrier) of a message.

Message Pricing—Source (e.g., wireless carrier) specific message pricing guidance.

Message Destination Address—The destination address of a message. Conventional telephone numbers or short codes (an illustrative example of which may be found in co-pending U.S. Application No. 60/445, 453, which is incorporated by reference herein in its entirety). These may be specified individually or by range.

Destination—The identified recipient (e.g., wireless carrier, content provider, etc.) of a message.

The list of parameters presented above is illustrative only and is not considered to be exhaustive. One of ordinary skill in the art will understand that numerous other parameters, such as, timing parameters/scheduling windows, message encoding indicators, etc. may also be employed.

It may also be possible that the generation of BAMs in real-time (i.e., as the message is processed) could bog down the wireless carrier's system. Accordingly, the BAMs may be scheduled so that they are deferred or delayed to a more desirable time frame. For example, it may be desirable for the BAMs to be sent during off-peak times so as to minimize load on the wireless carrier's system. Additionally, the rate at which BAMs are generated may be throttled or gated so as not to overwhelm the message receipt and processing capabilities of the BAM recipient.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A billing augmentation method, comprising:
receiving, over an electronic network, a message sent by a customer;
analyzing the message to determine if the message falls into a first service charge category or a second service charge category, the second service charge category having a billing charge greater than that of the first service charge category;
processing the message and generating an initial billing event to bill the customer an amount in accordance with the first service charge category; and
when the message falls into the second service charge category, generating, using a billing augmentation engine associated with an inter-carrier vendor that is in communication with a wireless carrier, a subsequent billing event to bill the customer in amount equal to the first service charge category to cause a charge to the customer to be augmented such that an overall charge to the customer is substantially the same as the billing charge of the second service charge category.

2. The billing augmentation method of claim 1, wherein the first service charge category is applied to basic messages for which a service provider has an existing associated billing event and the second service charge category is applied to premium messages for which the service provider does not have an existing associated billing event.

3. The billing augmentation method of claim 1, wherein the inter-carrier vendor is an outside vendor.

4. The billing augmentation method of claim 3, wherein the initial billing event is generated by the service provider and the inter-carrier vendor generates the subsequent billing event.

5. The billing augmentation method of claim 4, wherein the initial billing event and the subsequent billing event cause the overall charge to be increased by a same amount.

6. The billing augmentation method of claim 4, wherein the initial billing event and the subsequent billing event cause the overall charge to be increased by different amounts.

7. The billing augmentation method of claim 1, wherein the subsequent billing event is triggered by a billing augmentation message (BAM).

8. The method of claim 1, further comprising generating a plurality of subsequent billing events all in connection with the message.

9. The method of claim 8, wherein the plurality of subsequent billing events is considered to be associated with a same charge event to a customer.

* * * * *